United States Patent Office 3,240,669
Patented Mar. 15, 1966

3,240,669
3-1'-ADAMANTYLOXY-PROPIONIC ACID, NON-TOXIC SALTS THEREOF AND THEIR USE AS CHOLERETICS
Nicole Marie Preau, Paris, France, assignor to Rhone-Poulenc S.A., Paris, France, a corporation of France
No Drawing. Filed Mar. 19, 1962, Ser. No. 180,812
Claims priority, application France, Mar. 24, 1961, 856,752; Feb. 22, 1962, 888,858
3 Claims. (Cl. 167—55)

This invention relates to new therapeutically active adamantane compounds, to processes for their preparation and pharmaceutical compositions containing them.

According to the present invention, there are provided 3-1'-adamantyloxy-propionic acid of the formula:

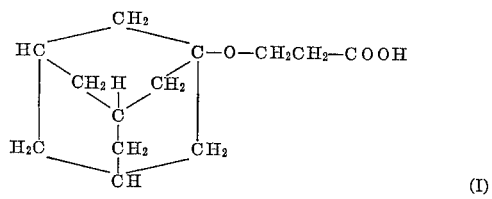

(I)

and non-toxic salts thereof, i.e. salts containing cations which are relatively innocuous to the animal organism in therapeutic doses of the salts, such as alkali metal and alkaline earth metal salts and amine salts, e.g. the ethanolamine salt. These new adamantane compounds possess useful pharmacological properties; in particular, they are very active choleretics.

According to a feature of the invention, 3-1'-adamantyloxy-propionic acid is prepared from 1-hydroxy-adamantane of formula Ad—OH, Ad representing the 1-adamantyl radical

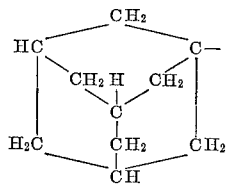

by conversion of the hydroxy group by methods known per se into a 2-carboxyethoxy group. The conversion is preferably effected by reacting 1-hydroxy-adamantane with a reactive ester of the formula:

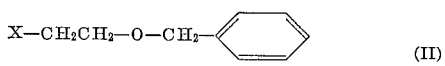

(II)

wherein X represents the acid residue of a reactive ester, such as a halogen atom or a sulphonic acid residue (preferably the toluene-p-sulphonic group), debenzylating the resulting 1-2'-benzyloxyethoxy-adamantane of the formula:

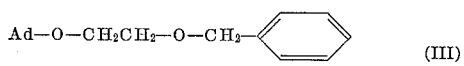

(III)

esterifying 2-1'-adamantyloxy-ethanol of the formula Ad—O—CH$_2$CH$_2$OH thus obtained with a toluene-p-sulphonyl halide (preferably chloride) to form the compound of the formula:

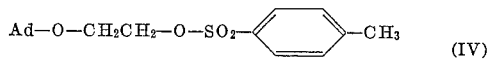

(IV)

reacting that compound (viz. 1-2'-toluene-p-sulphonyloxyethoxy-adamantane) with an alkali metal cyanide, and hydrolysing the resultant 3-1'-adamantyloxy-propionitrile of the formula Ad—O—CH$_2$CH$_2$—CN to 3-1'-adamantyloxy-propionic acid. When the last step of hydrolysis of 3-1'-adamantyloxy-propionitrile is carried out with an alkali metal hydroxide, an alkali metal salt of 3-1'-adamantyloxy-propionic acid is obtained directly.

According to a further feature of the invention, the acid of Formula I is prepared by reacting at elevated temperature 1-hydoxy-adamantane with β-propiolactone of the formula:

(V)

Non-toxic salts of 3-1'-adamantyloxy-propionic acid can be prepared in manner known per se, for example, by direct action of an alkali metal or alkaline earth metal derivative, such as the hydroxide, carbonate or bicarbonate, or an amine on the acid. The reaction is conveniently carried out in aqueous or liquid organic medium. The salt obtained can be isolated by conventional methods.

The following examples illustrate the invention.

*Example I*

1-toluene-p-sulphonyloxy-2-benzyloxyethane is condensed, in boiling xylene, with the sodium derivative of 1-hydroxy-adamantane giving (in 81% yield) 1-2'-benzyl-oxyethoxy-adamantane, B.P. 190–195° C./1 mm. Hg. which is then debenzylated (in 75% yield) by hydrogenation in the presence of palladium in acetic acid for 7 hours at 85° C. under a hydrogen pressure of 50 kg./cm.$^2$. Under these conditions, partially acetylated 2-1'-adamantyloxy-ethanol is obtained, which is saponified with alcoholic sodium hydroxide to liberate the alcohol completely.

A solution of 2-1'-adamantyloxy-ethanol (35 g.) in anhydrous pyridine (150 cc.), first cooled to 0° C., is mixed with a similarly cooled solution of toluene-p-sulphonyl chloride (34 g.) in anhydrous pyridine (300 cc.). After standing for 20 hours at 4° C., the reaction mixture is poured onto crushed ice (1.8 kg.). A white precipitate immediately forms which is separated, after the ice has been melted, washed with ice-water (7 x 30 cc.) and dried under reduced pressure. 1-toluene-p-solphonyloxyethoxy-adamantane (44.5 g.), M.P. 114° C., is obtained which can be recrystallised from methanol in 90% yield, M.P. 115° C.

1-toluene-p-sulphonyloxyethoxy-adamantane (58 g.), prepared as described above, is dissolved in absolute ethanol (650 cc.) while being made lukewarm. A solution of potassium cyanide (22 g.) in water (150 cc.) is added and the mixture boiled under reflux for 7 hours. The ethanol is evaporated on a water-bath under reduced pressure and residue taken up in water (100 cc.). After extraction with diethyl ether (500 cc. and then 4 x 100 cc.), the ethereal extracts are washed with water (2 x 50 cc.) and dried over sodium sulphate. After evaporation of the solvent, a crystalline mass of 3-1'-adamantyloxy-propionitrile (33 g.), M.P. about 45° C., is obtained, which can be purified by rectification (B.P. 125–130° C./0.3 mm. Hg).

A solution of 3-1'-adamantyloxy-propionitrile (20 g.), B.P. 125–130° C./0.3 mm. Hg, in alcoholic potassium hydroxide solution (150 g. of potassium hydroxide in 50 cc. of water and a sufficient quantity of absolute ethanol to give 250 cc. of solution) (250 cc.) is boiled for 5 hours and the alcohol then evaporated on a water-bath under reduced pressure. The colourless residue is taken up in water (100 cc.), the aqueous phase washed with diethyl ether (4 x 50 cc.) and acidified and the colourless precipitate consisting of pure 3-1'-adamantyloxy-propionic acid (2.3 g.), M.P. 65° C., separated.

*Example II*

A solution of 3-1'-adamantyloxy-propionitrile (prepared as described in Example I) (2 g.) in methanol (30 cc.) is boiled under reflux for 4 hours 30 minutes with barium hydroxide (6.3 g.), in suspension in water (12 cc.). After cooling, concentrated sulphuric acid (2 cc.) is added and the precipitate filtered off and washed with methanol (4 x 20 cc.) and diethyl ether (20 cc.). The filtrates are all combined, made alkaline with concentrated sodium hydroxide solution and concentrated to half-volume. The remaining solution is cooled, washed with diethyl ether (3 x 100 cc.), acidified with concentrated hydrochloric acid and the free acid extracted with diethyl ether (3 x 100 cc.). The ethereal solution is washed with water (10 cc.), dried over sodium sulphate, filtered and evaporated. The oily residue is dissolved in 0.25 N sodium hydroxide solution (40 cc.) by heating to 50° C., treated while hot with decolourising charcoal, filtered, cooled and acidified with 4 N hydrochloric acid. The colourless precipitate formed is separated, washed with water (3 x 2 cc.) and dried, giving 3-1'-adamantyloxy-propionic acid (0.63 g.), M.P. 65° C.

*Example III*

A mixture of 1-hydroxy-adamantane (36.5 g.) and $\beta$-propiolactone (36.5 g.) is heated for 3 days at 85° C. The yellow oil formed is taken up at 20° C. in 2 N sodium hydroxide solution (300 cc.) and insoluble material filtered off. This insoluble matter is taken up at 80° C. with N sodium hydroxide solution (500 cc.), cooled and the insoluble fraction removed. The two alkaline filtrates are acidified to pH 1 with hydrochloric acid and the colourless precipitates formed separated, washed with water (3 x 20 cc.) and dried at 20° C. under reduced pressure. A crystalline mass (weighing in all 52.1 g.) is thus obtained which is purified by redissolving in N sodium hydroxide solution (500 cc.), decolourising by boiling with animal charcoal, filtering, recooling, acidifying to pH 1, and separating and drying the colourless precipitate formed (44 g.), M.P. 61–63° C. After dissolving again in sodium hydroxide solution, boiling with charcoal, filtering off the charcoal, recooling, acidifying, and filtering, the crystalline precipitate is recrystallised from boiling methanol, giving 3-1'-adamantyloxy-propionic acid (40.5 g.), M.P. 66° C. This melting point is unchanged by recrystallisation from boiling acetonitrile.

The present invention further includes within its scope pharmaceutical compositions which comprise 3-1'-adamantyloxy-propionic acid or non-toxic salt thereof together with a pharmaceutical carrier or coating. In pharmaceutical applications the compounds of the present invention will normally be administered orally, rectally or parentally.

Solid compositions for oral administration include compressed tablets, pills, dispersible powders, and granules. In such solid compositions the active compound is admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing the active substance with or without the addition of diluents or excipients.

For rectal administration the active substance can be incorporated in suppositories made of cocoa butter or a suitable wax base.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, or by irradiation. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time.

I claim:

1. A member of the class consisting of 3-1'-adamantyloxy-propionic acid and non-toxic salts thereof.

2. Pharmaceutical compositions which comprise, as active ingredient, a member of the class consisting of 3-1'-adamantyloxy-propionic acid and non-toxic salts thereof, in association with a significant amount of a pharmaceutical carrier.

3. A method for improving the bile flow in an animal organism which comprises administering to the said animal organism at a dosage rate sufficient to improve the said bile flow one member of the class consisting of 3-1'-adamantyloxy-propionic acid and non-toxic salts thereof, in association with a significant amount of a pharmaceutical carrier.

No references cited.

LORRAINE A. WEINBERGER, *Primary Examiner.*

CHARLES B. PARKER, *Examiner.*